US006644680B1

(12) United States Patent  
Coe (10) Patent No.: US 6,644,680 B1
(45) Date of Patent: Nov. 11, 2003

(54) TRAILER ALIGNMENT APPARATUS (76) Inventor: Robert N. Coe, 18562 Valentine Rd., Mt. Vernon, WA (US) 98273

( * ) Notice: Subject to any disclaimer, the term of this patent is extended or adjusted under 35 U.S.C. 154(b) by 0 days.

(21) Appl. No.: 10/205,454

(22) Filed: Jul. 24, 2002

(51) Int. Cl.[7] .............................. B60D 1/55; B60D 1/36
(52) U.S. Cl. ................ 280/477; 280/491.1; 280/491.2; 280/491.3
(58) Field of Search .......................... 280/491.1, 491.2, 280/491.3, 491.4, 491.5, 492, 477, 478.1, 479.2, 479.3

(56) References Cited

U.S. PATENT DOCUMENTS

| 2,386,195 | A | * | 10/1945 | Clark | 280/33.14 |
|---|---|---|---|---|---|
| 2,970,851 | A | * | 2/1961 | Jones | 280/478 |
| 3,521,908 | A | | 7/1970 | Carter | 280/479 |
| 3,718,347 | A | | 2/1973 | Mann | 280/467 |
| 3,734,539 | A | | 5/1973 | Salmi | 280/477 |
| 3,738,683 | A | * | 6/1973 | Tate | 280/478 R |
| 3,740,078 | A | * | 6/1973 | Murr | 280/478 R |
| 3,904,225 | A | * | 9/1975 | George et al. | 280/478 R |
| 3,979,138 | A | | 9/1976 | George et al. | 280/478 |
| 4,073,508 | A | | 2/1978 | George et al. | 280/478 |
| 4,116,460 | A | * | 9/1978 | Drower | 280/478 R |
| 4,770,436 | A | | 9/1988 | Anderson | 280/463 |
| 4,773,667 | A | | 9/1988 | Elkins | 280/478 |
| 4,893,829 | A | | 1/1990 | Davis | 280/479 |
| 4,976,453 | A | | 12/1990 | Kaplan | 280/479 |
| 5,048,854 | A | | 9/1991 | Clark | 280/477 |
| 5,085,408 | A | * | 2/1992 | Norton et al. | 254/325 |
| 6,494,477 | B1 | * | 12/2002 | Parker | 280/479.1 |

* cited by examiner

Primary Examiner—Lesley D. Morris
Assistant Examiner—Tony Winner
(74) Attorney, Agent, or Firm—Dean A. Craine (57) ABSTRACT A trailer hitch alignment apparatus designed to be used with an existing trailer hitch that includes a hollow frame tube mounted transversely on the rear of a towing vehicle. The apparatus includes a first leg member that slides into an end opening on the transversely aligned frame tube attached to the frame on the towing vehicle. Attached to the distal end of the first leg member is a joint bracket with a ratchet mechanism disposed therein. Pivotally attached to the distal end of the joint bracket is a second leg member. The ratchet mechanism is coupled to the second leg member enabling the user to forcibly pivot the second leg member around the first leg member. Attached inside the rear surface of the first leg member is a cable assembly containing a cable wound onto a spool. Attached to the spool is a locking, tightening mechanism that allows the cable to be forcibly wound and unwound from the spool. Extending from the distal end of the second leg member is a telescopic extension arm. During assembly, the cable extends from the cable assembly through the second leg member and into the extension arm. The cable then exits from the distal end of the extension arm and attaches to the tongue receiver on the trailer. The user then selectively tightens the cable and adjusts the length of the extension arm with respect to the second leg member and the angular orientation of the second leg member to the first leg member to pull the trailer along a desired line offset from the line that runs directly between the ball and the trailer.

20 Claims, 6 Drawing Sheets

TRAILER ALIGNMENT APPARATUS

BACKGROUND OF THE INVENTION

1. Field of the Invention

The present invention relates generally to devices that aid in aligning and attaching the trailer hitch receiver to the ball of a towing vehicle.

2. Description of the Related Art

Trailer hitches are commonly used to tow trailers or other types of wheeled vehicles. One problem associated with towing vehicles is the act of aligning and connecting the receiver on the trailer to the ball on the trailer hitch. This act is especially troublesome when the driver is alone and when the trailer is too heavy to manually move.

Heretofore, trailer hitches have been developed that include an extendable arm that pivots outward from the trailer hitch and connects to the receiver or to the trailer tongue. During this operation, the extendable arm is pivoted so that the receiver is pulled towards the ball. Still other trailer hitches include a winch cable or other retractable guideline attached to the trailer hitch that connects to the receiver to pull the trailer toward the ball.

In instances where obstructions, such as buildings, shrubs, fences, and parked vehicles, prevent the trailer from being moved in a straight line towards the ball, the obstruction must be removed or the towing vehicle must be moved to a location so that the ball is directly aligned with the receiver, or an alternative towing vehicle must be used.

What is needed is a trailer alignment system that allows one individual to align and attach the receiver on a trailer to the ball of a towing vehicle. What is also needed is a trailer alignment apparatus that allows the user to move the trailer along a line offset from the line directly leading to the ball so that the receiver may be placed in a new position for easier, direct attachment to the ball.

SUMMARY OF THE INVENTION

It is an object of the present invention to provide a trailer alignment apparatus with which a driver does not need the help of any additional persons in aligning the trailer to the towing vehicle.

It is another object of the present invention to provide such a trailer alignment apparatus that allows the trailer to be temporarily moved along a line offset from the line leading directly to the ball on the towing vehicle so that the trailer may be placed in a position for easier, direct attachment to the ball.

These and other objects of the present invention are met by a trailer hitch alignment apparatus that is used with a trailer hitch that includes a supplied or existing elongated, hollow frame tube aligned transversely and attached to the frame on a towing vehicle. Such trailer hitches typically include a two-inch or one-and-three-quarter-inch diameter ball attached to a horizontal plate that extends rearward from the frame tube. The apparatus includes a first leg member that is partially inserted into the distal end opening on the frame tube. Perpendicularly mounted on the distal end of the first leg member is a rearward extending rigid joint bracket. Pivotally attached to the distal end of the joint bracket is a second leg member. A ratchet mechanism is disposed inside the joint bracket which, during use, forcibly pivots the second leg member around the distal end of the first leg member.

Attached to the rear surface of the section of the first leg member exposed from the frame tube is a cable assembly containing a rotating spool with a cable wound thereon. Attached to the spool is a locking, turning mechanism that allows the cable to be forcibly wound and unwound from the spool.

Extending from the distal end of the second leg member is a telescopic extension arm. During assembly, the cable extends from the cable assembly and into an opening formed on the rear surface of the second leg member. A pulley is disposed inside an opening over which the cable rides and extends longitudinally and distally inside the second leg member and exits the distal end of the extension arm. A clevis or suitable clip or hook is attached to the distal end of the cable that selectively attaches to the trailer tongue or receiver.

During use, the angle of the second leg member relative to the first leg member and the length of the extension arm are adjusted so that the trailer may be pulled along a desired line offset from the line that extends from the ball to the receiver. The user then tightens the cable and selectively adjusts the relative position of the extension arm on the second leg member and the angular orientation of the second leg member on the first leg member, to pull the receiver along the desired line. As the cable is tightened, the user may adjust only the length of the extension arm or only the angular orientation of the second leg member on the first leg member to follow a new line offset from the line to the ball. Alternately, the user may use the swing movement of the second leg member as a means to pull the trailer to a temporary position and then use the cable to pull the trailer towards the ball.

DESCRIPTION OF THE PREFERRED EMBODIMENT(S)

In the accompanying Figures there is shown a trailer hitch alignment apparatus 10 used to assist users to connect trailers or other towed vehicles to the ball 11 of the trailer hitch. The apparatus 10 is especially useful when the trailer is too heavy to manually move or cannot be moved in a straight line to the ball 11.

The trailer hitch alignment apparatus 10 includes a supplied or existing elongated, hollow, rigid frame tube 12 transversely aligned and attached to the frame 9 on a towing vehicle (not shown). A two-inch or one-and-a-half-inch diameter ball 11 is attached to a horizontal plate 13 that extends rearward from the frame tube 12.

Figure 1:
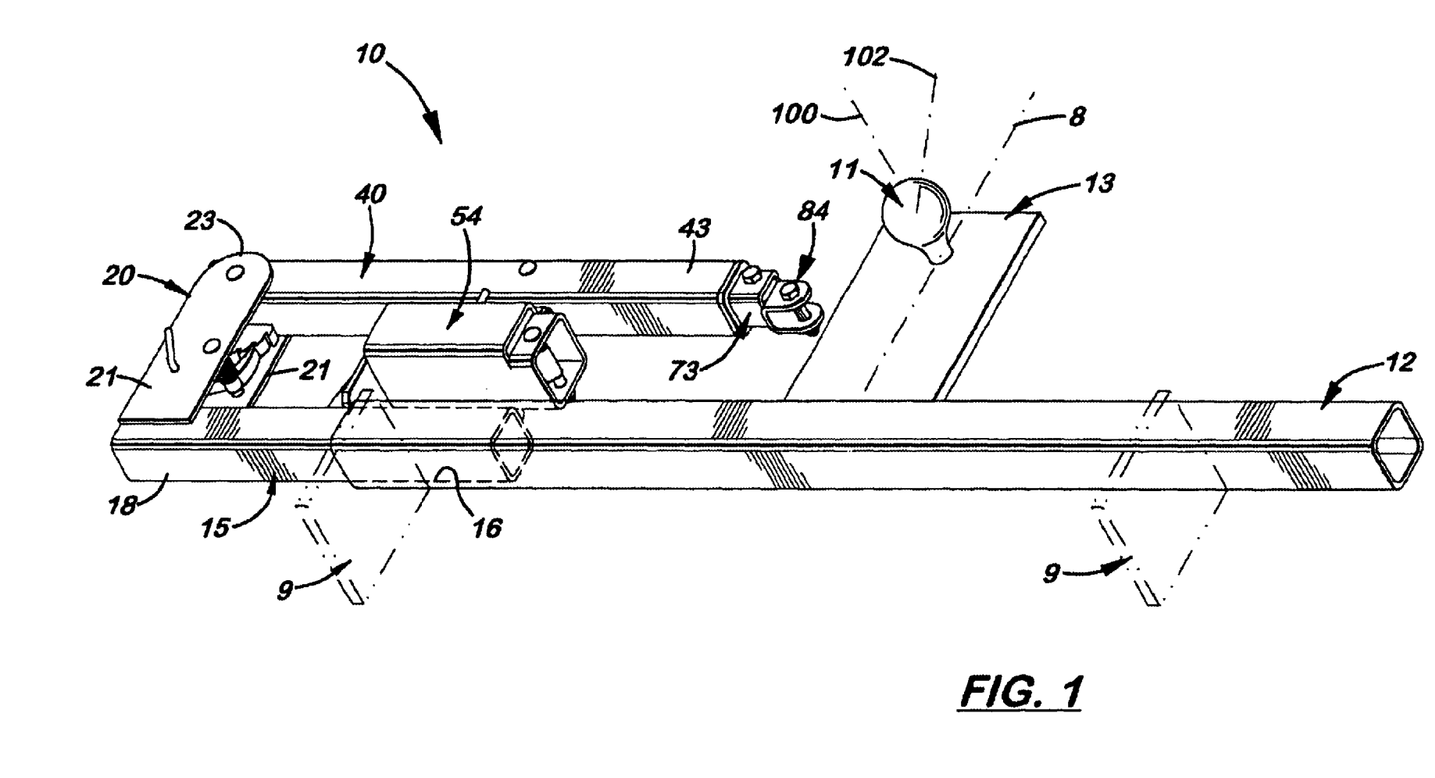
FIG. 1 is perspective view of the trailer alignment apparatus showing the extension arm completely retracted inside the second leg member.
Figure 2:
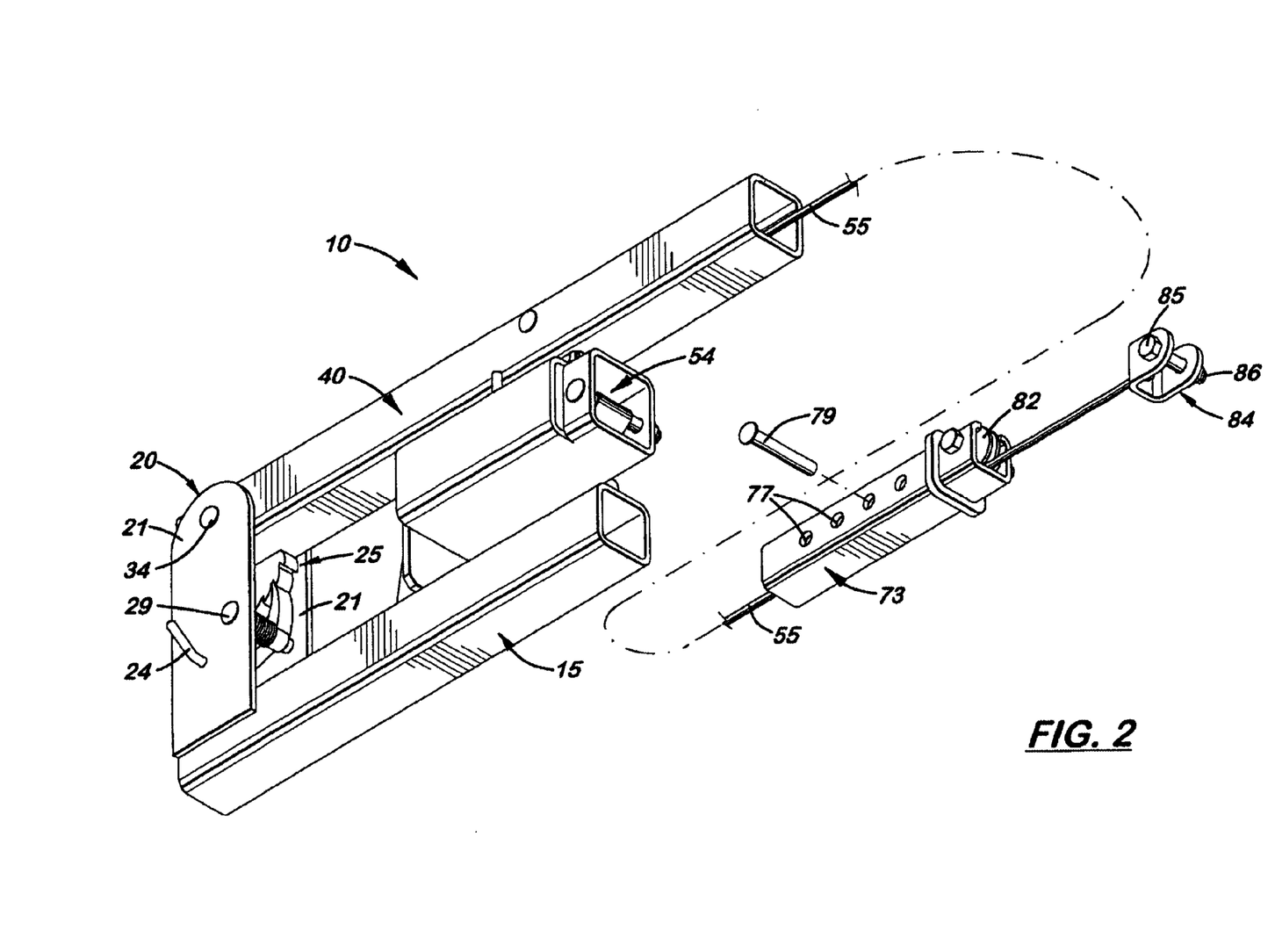
FIG. 2 is another perspective view of the trailer alignment apparatus showing the extension arm removed from the second leg member.

As shown more clearly in FIG. 2, the system 10 also includes a first leg member 15 with its proximal end 16 inserted into one of the open ends on the frame tube 12. Perpendicularly mounted on the distal end 18 of the first leg member 15 is a joint bracket 20 that includes two plates 21 spaced apart on opposite sides of the first leg member 15 and extending rearward therefrom. Pivotally attached between the distal ends 23 of the two plates 21 is a second leg member 40. Disposed inside the two plates 21 is a ratchet mechanism 25 which, during use, forcibly pivots the second leg member 40 around the joint bracket 20.

The second leg member 40 is hollow and is sufficient in length to extend approximately to the center axis 8 of the towing vehicle when the first leg member 15 is attached to the frame tube 12 and the second leg member 40 is aligned parallel to the first leg member 15. Extending from the distal end 43 of the second leg member 40 is a telescopic extension arm 73. The extension arm 73 is adjustable in length from the distal end 43 of the second leg member 40.

Figure 3:
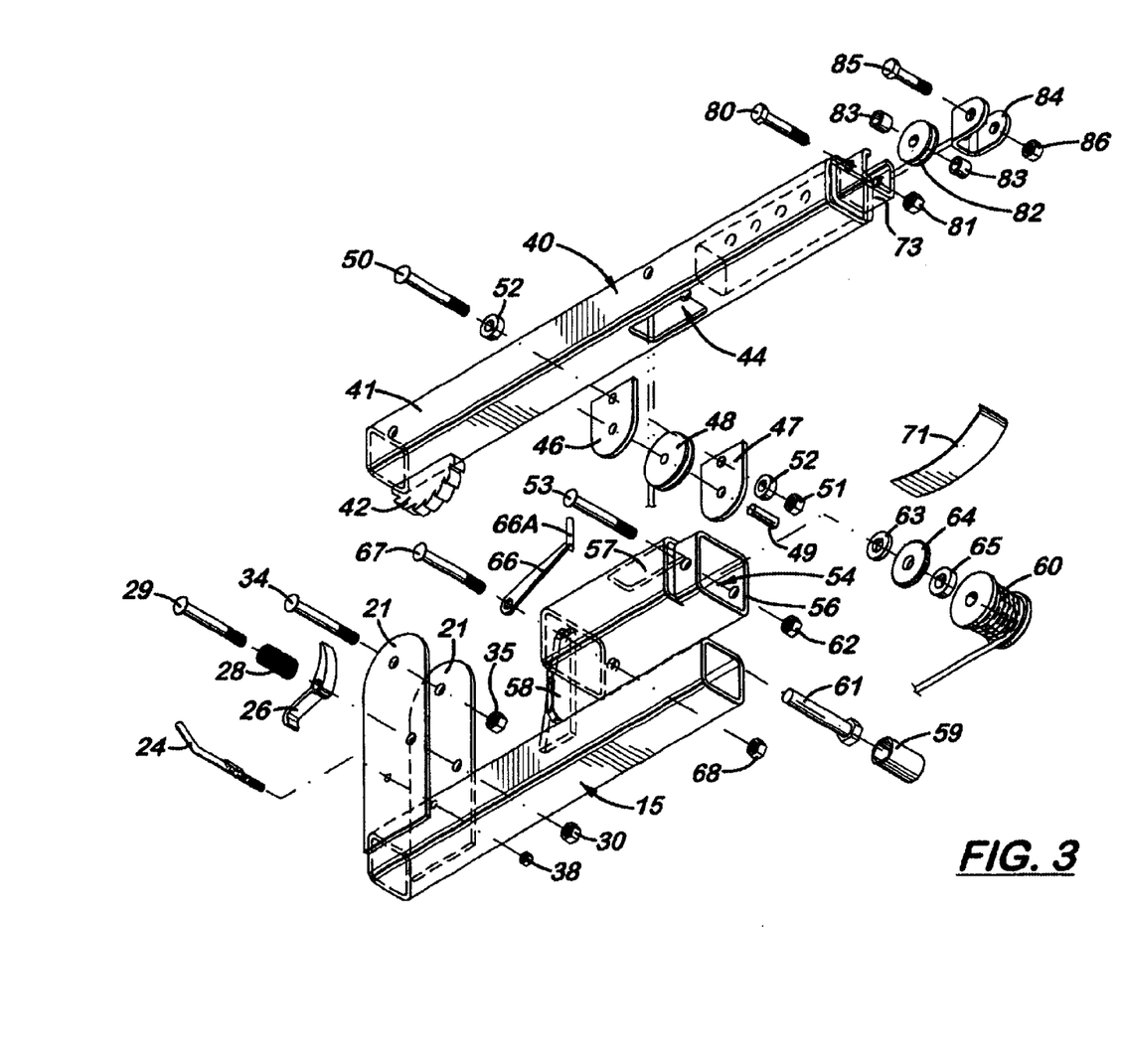
FIG. 3 is an exploded perspective view of the trailer alignment apparatus.
Figure 4:
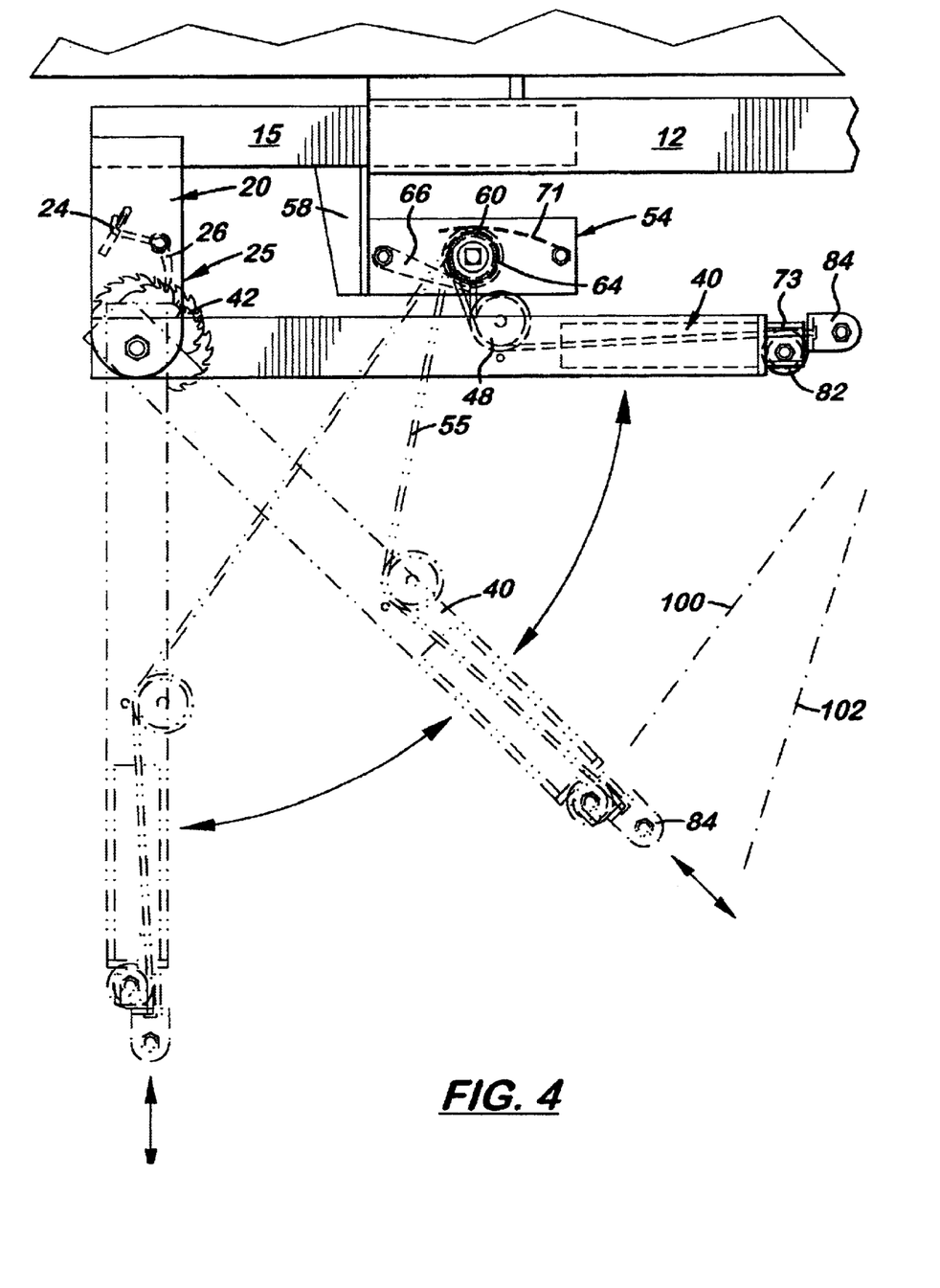
FIG. 4 is a bottom plan view of the invention showing the movement of the first and second leg members.
Figure 5:
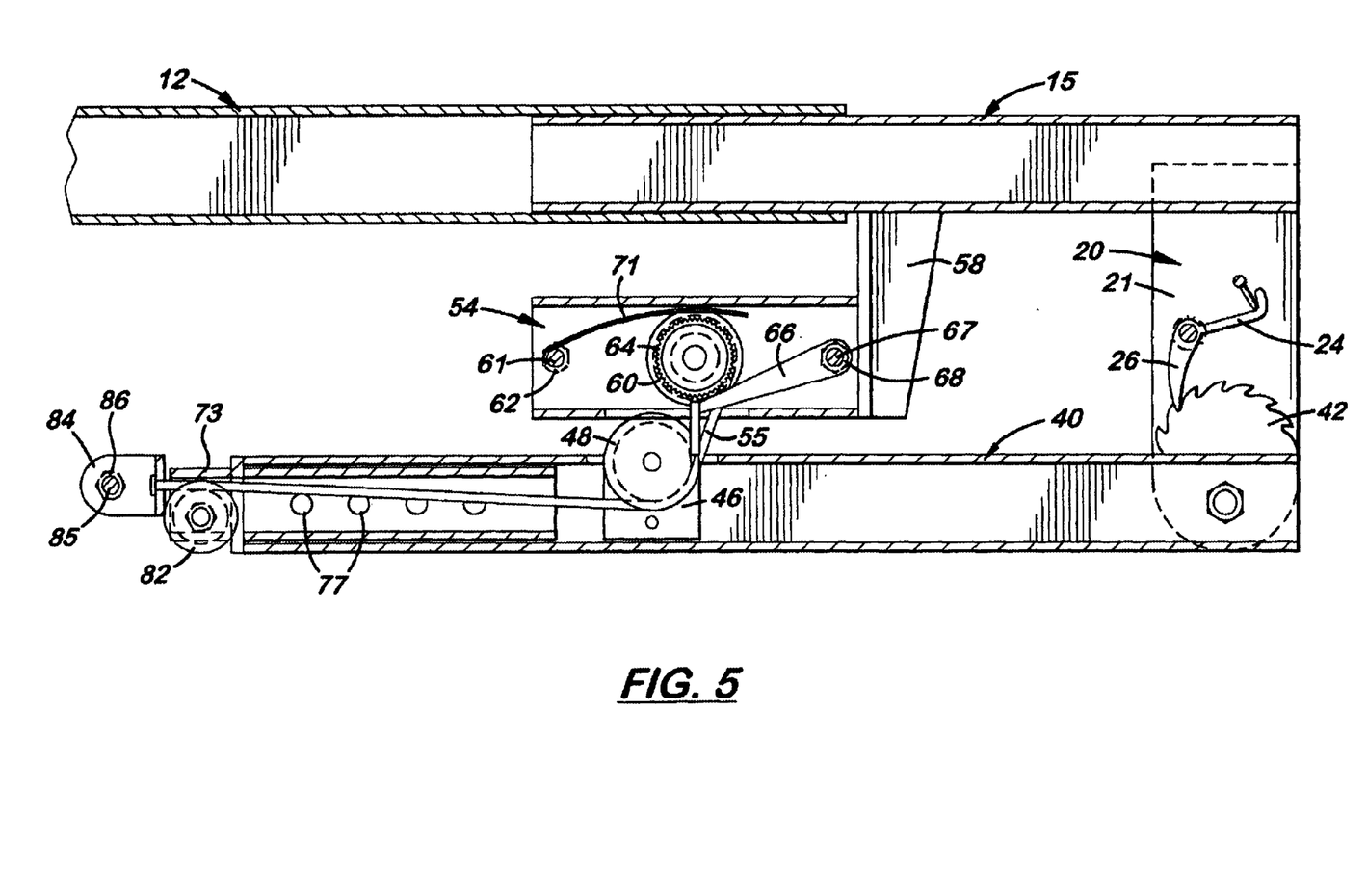
FIG. 5 is a sectional, top plan view of the invention.
Figure 6:
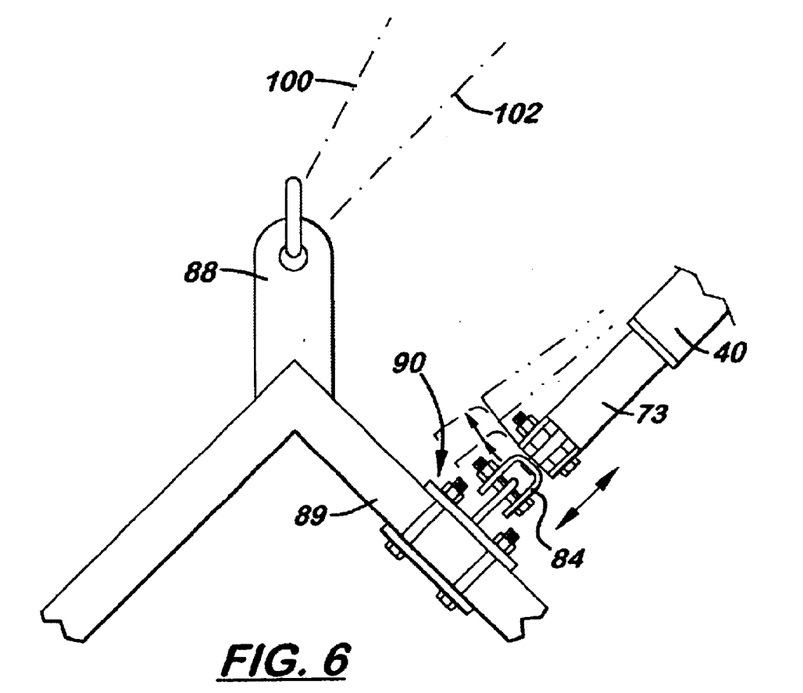
FIG. 6 is a top plan view of the trailer tongue with a pulling clip attached to a front diagonal strut.
Figure 7:
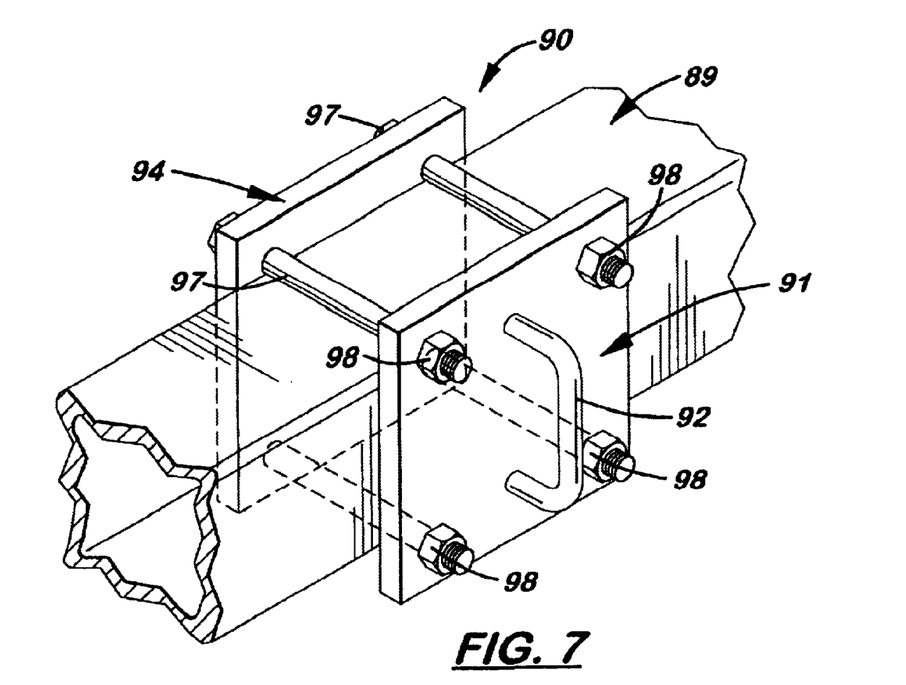
FIG. 7 is a sectional, side elevational view of the pulling clip.

Extending from the distal end of the extension arm 73 is a cable 55. The proximal end of the cable 55 is wound onto a spool 60 located inside a cable assembly 54 attached to the rear surface of the first leg member 15, as shown in FIG. 3. The cable 55 extends rearward from the cable assembly 54, through a rear opening 44 formed on the front surface of the second leg member 40. The cable 55 then extends longitudinally inside the second leg member 40, through the extension arm 73, and exits the distal opening formed thereon. A clevis 84 or suitable hook is attached to the distal end of the cable 55 that selectively attaches to the trailer receiver (not shown) or tongue 88.

The extension arm 73 is adjusted in length so that the trailer is pulled along a line offset from the ball 11. Formed on the extension arm 73 is a plurality of holes 77 designed to receive a pin 79 that prevents inward movement of the extension arm 73 on the second leg member 40. A pulley 48 is located just inside the opening 44 which acts as a fulcrum for the cable 55. A separate pulley 82 is set between bushings 83 and disposed within the extension arm 73 via bolt 80 and nut 81.

The ratchet mechanism 25 located in the joint bracket 20 includes a semi-circular tooth member 42 attached to the inside surface of the second leg member 40 near the proximal end 41. The joint bracket 20 is connected to the second leg member 40 by axle bolt 34 and nut 35. Extending between the two plates 21 is an axle 29 around which a pawl 26 is disposed. The end of the axle 29 is threaded and connects to a nut 30 that holds the axle 29 on the joint bracket 20. A spring 28 is also disposed around the axle 29 and used to bias the pawl 26 in an engaged position against a tooth on the tooth member 42. Also included in the ratchet mechanism 25 is a release lever 24 that is used to move the pawl 26 to a disengaged position on the tooth member 42 so that second leg member 40 may be freely pivoted over the joint bracket 20. A threaded nut 38 connects to threads formed on the end of the release lever 24 that extend from the opposite side of the joint bracket 20 to connect the release lever 24 to the joint bracket 20.

The cable assembly 54 includes a hollow, rectangular housing 56 attached at one end to a support bracket 58 that is attached and extends rearward from the rear surface of the first leg member 15. In the preferred embodiment, the housing 56 includes a large lower chamber and a smaller upper chamber. Formed on the rear surface of the housing 56 is a rear opening 57 that communicates with the lower chamber. The spool 60 is disposed inside the lower chamber and supported therein by an axle 53. A small washer 63, and a bushing 65 are disposed around the axle 53 to allow the spool 60 to rotate freely inside the housing 56. The lower end of the axle 53 extends beyond the bottom surface of the housing 56 and attaches to a socket nut 59 which is capable of attaching to a complementary-sized drive on a socket tool (not shown). The head of the axle 53 extends into the upper chamber and attaches to a tooth washer 64. Located inside the upper chamber is a release lever assembly 66 that is attached at one end to a transversely aligned bolt 67 located near the opposite end of the housing 56. A nut 68 is used to attach bolt 67 to the housing 56. The release lever assembly 66 extends inward towards the tooth washer 64. Attached to the release lever assembly 66 is a handle 66A that moves between engaged and disengaged positions with the tooth washer 64. When the release lever assembly 66 is moved to an engaged position, the axle 53 only turns in one direction. When the release lever assembly 66 is moved to a disengaged position, the axle 53 can turn freely. Located on the end of the housing 56 is a leaf spring 71 used to apply a resistant force against the cable 55 as it is wound onto the spool 60. The leaf spring 71 is supported by a transversely aligned threaded bolt 61 and nut 62.

As mentioned above, the pulley 48 is disposed inside the opening 44 formed on the second leg member 40. The pulley 48 is supported by an axle 49 held between two parallel pulley brackets 46, 47. A threaded bolt 50, a nut 51, and two bushings 52 are used to hold the pulley 48 between the two pulley brackets 46, 47.

As stated above, the first leg member 15 is inserted into the open end of the frame tube 12 permanently attached to the vehicle vertical frame 9. The first leg member 15 is pushed into the frame tube 12 until the support bracket 58 is adjacent to the end of the frame tube 12. The release lever 24 is then disengaged from the ratchet mechanism 25 so that the second leg member 40 may be pivoted to a desired angle relative to the first leg member 15. The extension arm 73 is adjusted in length from the end of the second leg member 40 so that the clevis 84 may be properly aligned with the trailer. The release lever assembly 66 is then moved to a disengaged position so that the end of the cable 55 may be pulled freely from the end of the extension arm 73 and connected to the trailer tongue 88 and receiver.

In the preferred embodiment, the clevis 84 is bolted to the tongue 88 or to an optional clip 90 attached to a diagonal member 89 on the trailer receiver. In the preferred embodiment, the clip 90 includes a rigid front plate 91 located over the outside surface of the diagonal member 89 and a rear plate 94 located on the inside surface of the diagonal member 89. Four threaded bolts 97 and nuts 98 are tightened and used to securely attach the plates 91, 94 in place on the diagonal member 89. Formed on the outer surface of the front plate 91 is a U-shaped member 92 to which the clevis 84 selectively attaches the cable 55 to the tongue 88. The clevis 84 is connected to the clip 90 by bolt 85 and nut 86.

After the cable 55 is attached to the clip 90, the user simultaneously tightens the cable 55, adjusts the length of the extension arm 73 on the second leg member 40, and adjusts the angular orientation of the second leg member 40 on the first leg member 15, to pull the trailer tongue 88 either on a direct line 100 towards the ball 11 or on a line 102 offset from the direct line 100 to the ball 11. As the cable 55 is tightened, the user may be required to adjust only the length of the extension arm 73 or only the angular orientation of the second leg member 40 on the first leg member 15. After the trailer tongue 88 has been moved to its desired position, the first leg member 15 may be removed from the frame tube 12. It should be understood that the first leg member 15 may be inserted into either one of the open ends of the frame tube 12. Typically, the user selects an open end that allows the second leg member 40 to move in an acute angle.

In the preferred embodiment, the first leg member 15 and the second leg member 40 are made of steel square 2"×2" tubing material approximately 16 inches and 22 inches in length, respectively. The extension arm 73, also made of steel, square 1½"×1 ½" tubing material, is approximately 9 inches in length.

In compliance with the statute, the invention described herein has been described in language more or less specific as to structural features. It should be understood, however, that the invention is not limited to the specific features shown since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A trailer hitch alignment apparatus for attaching a receiver to a ball attached to a towing vehicle, comprising:
    a. a transversely aligned frame tube attached to the rear surface on a towing vehicle, said frame tube including at least one end opening;
    b. a first leg member having opposite proximal and distal ends, said first leg member being longitudinally aligned with said frame tube so that said proximal end slidingly fits into said end opening on said frame tube;
    c. a second leg member pivotally coupled to said distal end on said first leg member, said second leg member having opposite proximal and distal ends;
    d. a length adjustable extension arm longitudinally aligned on said second leg member, said extension arm extending from said distal end of said second leg member;
    e. a cable assembly attached to said first leg member; said cable assembly including a cable wound on a spool and means for selectively dispensing said cable therefrom, said cable extending from said cable assembly into said second leg member, said extension arm and through the distal end of said extension arm;
    f. means for temporarily connecting the distal end of said cable to a trailer;
    g. means for selectively locking said extension arm in a fixed length from said second leg; and,
    h. means for adjusting an angular orientation of said second leg member with respect to said first leg member.

2. The trailer hitch alignment apparatus, as recited in claim 1, wherein said means for locking said extension arm in a fixed length from said second leg member is a pin that connects to said extension arm and prevents inward movement of said extension arm on said second leg member.

3. The trailer hitch alignment apparatus, as recited in claim 1, further including an opening formed on said second leg member and a pulley disposed inside said opening, said cable extending into said opening and over said pulley.

4. The trailer hitch alignment apparatus, as recited in claim 1, wherein said means for tightening said cable is a selectively engageable locking mechanism coupled to said spool that engages said spool to selectively rotate in one direction.

5. The trailer hitch alignment apparatus, as recited in claim 1, wherein said means for adjusting the angular orientation of said second leg member with respect to said first leg member is a ratchet mechanism located in a rearward extending joint bracket and disposed between the adjoining ends of said first leg member and said second leg member.

6. The trailer hitch alignment apparatus, as recited in claim 1, wherein said extension leg extends telescopingly from said second leg member.

7. The trailer hitch alignment apparatus, as recited in claim 1, wherein said frame tube and said first leg member are made of square, tubular material.

8. The trailer hitch alignment apparatus, as recited in claim 1, wherein said means for temporarily connecting the distal end of said cable is a clevis.

9. The trailer hitch alignment apparatus, as recited in claim 1, further including a clip that attaches to a trailer to which said means for temporarily connecting the distal end of said cable may be attached.

10. A trailer hitch alignment apparatus, comprising:
    a. length adjustable cable attached at one end to a towing vehicle;
    b. means for temporarily attaching said cable to a trailer;
    c. means for adjusting the length of said cable;
    d. a second leg member with a length adjustable extension arm attached thereto, said second leg member and said extension arm being hollow thereby enabling said cable to extend therethrough;
    e. means for adjusting the length of said extension arm extended from said second leg member;
    f. means for pivotally mounting said second leg member to a towing vehicle; and,
    g. means for forcibly adjusting an angular orientation of said second leg member with respect to said towing vehicle.

11. The trailer hitch alignment apparatus, as recited in claim 10, wherein the means for temporarily attaching said cable to a trailer is a spool mounted on a first leg member selectively attached to a towing vehicle.

12. The trailer hitch alignment apparatus, as recited in claim 11, further including a frame tube attached to a towing vehicle that slidingly receives said first leg member.

13. The trailer hitch alignment apparatus, as recited in claim 10, wherein said means for adjusting the length of said cable is a direction adjustable, locking, turning mechanism.

14. The trailer hitch alignment apparatus, as recited in claim 13, wherein said direction adjustable, locking, turning mechanism is a rotating axle used to mount said spool inside a housing, said bolt including a tooth washer that is engaged by a movable release lever that selectively is moved to engage and disengage said tooth washer to prevent rotation of said axle.

15. The trailer hitch alignment apparatus, as recited in claim 10, wherein said means for forcibly adjusting the angular orientation of said second leg member is adjusting the angular orientation of said second leg member with respect to said first leg member.

16. The trailer hitch alignment apparatus, as recited in claim 10, wherein said extension arm extends telescopingly from said second leg member.

17. The trailer hitch alignment apparatus, as recited in claim 10, wherein said frame tube and first leg member are made of square, tubular material.

18. The trailer hitch alignment apparatus, as recited in claim 10, wherein said means for temporarily connecting the distal end of said cable is a clevis.

19. The trailer hitch alignment apparatus, as recited in claim 10, further including a clip that attaches to a trailer to which said means for temporarily connecting the distal end of said cable may be attached.

20. A trailer hitch alignment apparatus, comprising:
  a. a first leg member transversely aligned and attached to a rear surface on a towing vehicle;
  b. a spool rotatably attached to said first leg member;
  c. a hollow second leg member pivotally attached at one end to one end of said first leg member;
  d. a longitudinally aligned extension arm disposed on said second leg member, said extension arm being hollow;
  e. a cable wound onto said spool and extending into said second leg member and said extension arm, said cable having a distal end that extends from said extension arm;
  f. means for limiting the inward movement of said extension arm on said second leg member; and,
  g. means for forcibly adjusting the angular orientation of said second leg member with respect to said first leg member.

\* \* \* \* \*